(12) United States Patent
Simons et al.

(10) Patent No.: US 8,300,577 B2
(45) Date of Patent: Oct. 30, 2012

(54) USING POSITION FOR NODE GROUPING (75) Inventors: Paul Richard Simons, Redhill (GB);
Stephen Michael Pitchers, Redhill (GB)

(73) Assignee: Koninklijke Philips Electronics N.V.,
Eindhoven (NL)

( * ) Notice: Subject to any disclaimer, the term of this patent is extended or adjusted under 35 U.S.C. 154(b) by 920 days.

(21) Appl. No.: 12/281,489

(22) PCT Filed: Mar. 5, 2007

(86) PCT No.: PCT/IB2007/050712
§ 371 (c)(1),
(2), (4) Date: Sep. 3, 2008

(87) PCT Pub. No.: WO2007/102114
PCT Pub. Date: Sep. 13, 2007

(65) Prior Publication Data
US 2011/0122796 A1 May 26, 2011

(30) Foreign Application Priority Data
Mar. 6, 2006 (EP) .................................... 06110707

(51) Int. Cl.
*H04W 4/00* (2009.01)
(52) U.S. Cl. ......................... 370/328; 370/338; 455/446
(58) Field of Classification Search .................. 370/254, 370/310, 328, 329, 338, 463; 455/446, 456.1
See application file for complete search history.

(56) References Cited

U.S. PATENT DOCUMENTS

| | | | |
|---|---|---|---|
| 6,240,098 B1* | 5/2001 | Thibault et al. | 370/431 |
| 7,035,240 B1* | 4/2006 | Balakrishnan et al. | 370/338 |
| 7,155,233 B2* | 12/2006 | Nagato et al. | 455/450 |
| 7,181,228 B2* | 2/2007 | Boesch | 455/456.1 |
| 7,639,988 B2* | 12/2009 | Abusch-Magder et al. | 455/67.11 |
| 2002/0145394 A1 | 10/2002 | Morgan et al. | |
| 2002/0154025 A1 | 10/2002 | Ling | |
| 2003/0232598 A1 | 12/2003 | Aljadeff et al. | |

FOREIGN PATENT DOCUMENTS

| | | |
|---|---|---|
| WO | 0197466 A1 | 12/2001 |
| WO | 0213490 A2 | 2/2002 |
| WO | 03077610 A1 | 9/2003 |

* cited by examiner

*Primary Examiner* — Kerri Rose
(74) *Attorney, Agent, or Firm* — Larry Liberchuk (57) ABSTRACT

A computer algorithm for grouping a derived spatial arrangement of wireless communication nodes. The wireless communication nodes form a wireless communication network and are configured to control the operation of luminaires in a lighting array. The position of each node in the communication network corresponds to the position of a particular luminaire in the lighting array. The algorithm divides the arrangement of nodes into a plurality of spatial groups, each of which is defined by a line which joins the group's member nodes together. The groups are ranked according to their statistical attributes and a number of groups are selected as control groups, such that the member nodes, and hence luminaires, of each control group may be controlled by a single switch or sensor.

20 Claims, 9 Drawing Sheets

# USING POSITION FOR NODE GROUPING

FIELD OF THE INVENTION

The present invention relates to identifying the structure of an arrangement of nodes based upon their positioning information and, particularly, to identifying the structure of a wirelessly controlled lighting array.

BACKGROUND OF THE INVENTION

A typical wireless lighting array comprises a large number of luminaires and a smaller number of switches and sensors. The luminaires are typically arranged in a regular structure in order that they provide an even level of background light. The individual elements of the lighting array communicate with one another over a wireless communication network, which is formed by an array of communication nodes. The wireless network provides a means for communication between neighbouring luminaires and for communication between the luminaires and the switches or sensors.

In order to commission such a lighting system, the array of luminaires is divided up into groups such that each group is controlled by a particular switch or sensor. For the lighting system to work correctly, it is important that the luminaires are divided up into sensible spatial control groupings so that each spatial group can be assigned to the closest appropriate switch or sensor. However, before the luminaires are assigned to spatial groups, it is necessary to ascertain their individual positions within the array.

It is known to derive position information for individual luminaires, within an array, using a topology generation algorithm. Such topology generation algorithms use range data, provided by the node network in the form of ranges between pairs of luminaires, to derive the relative positions of individual luminaires. The establishment of the positions of individual luminaires leads to an understanding of the structure of the lighting array.

Correctly understanding the structure of the lighting array is key to making the correct spatial groupings of luminaires. However, the range measurements between communication nodes, which are used to derive the structure of the array, are subject to error. Any such errors in the range measurements are propagated when calculating the relative positions of the individual luminaires, resulting in an erroneous understanding of the array's structure. Consequently, individual luminaires are not placed in the correct spatial group and, hence, are not controlled by the closest appropriate switch or sensor.

SUMMARY OF THE INVENTION

According to the present invention, there is provided a method of grouping a derived spatial arrangement of wireless nodes in order to divide the nodes into a plurality of groups of nodes, wherein the assignment of a particular node to a particular group is based upon the particular node's position in the spatial arrangement such that each of the groups comprises nodes which are located adjacent to one another.

A particular wireless node is assigned to a particular group if its position in the spatial arrangement of nodes falls within a threshold distance of a point or array of points defining the centre of the particular group.

The wireless nodes are members of a wireless communication network may comprise electrically powered wireless communication nodes configured such that they are able to communicate with one another in order to control the operation of a wireless lighting array.

BRIEF DESCRIPTION OF THE DRAWINGS

Embodiments of the present invention will now be described, by way of example, with reference to the accompanying drawings, in which.

DETAILS OF THE INVENTION

A wireless lighting array, according to the invention, is made up of electrically driven luminaires, which are controlled wirelessly by a smaller number of switches or sensors. Each luminaire is associated with a wireless communication node, which is configured such that it is able to communicate with its neighbouring nodes and with the control switches or sensors. The wireless communication nodes form a wireless network which allows the functionality of each element in the lighting array to be determined.

Figure 1:
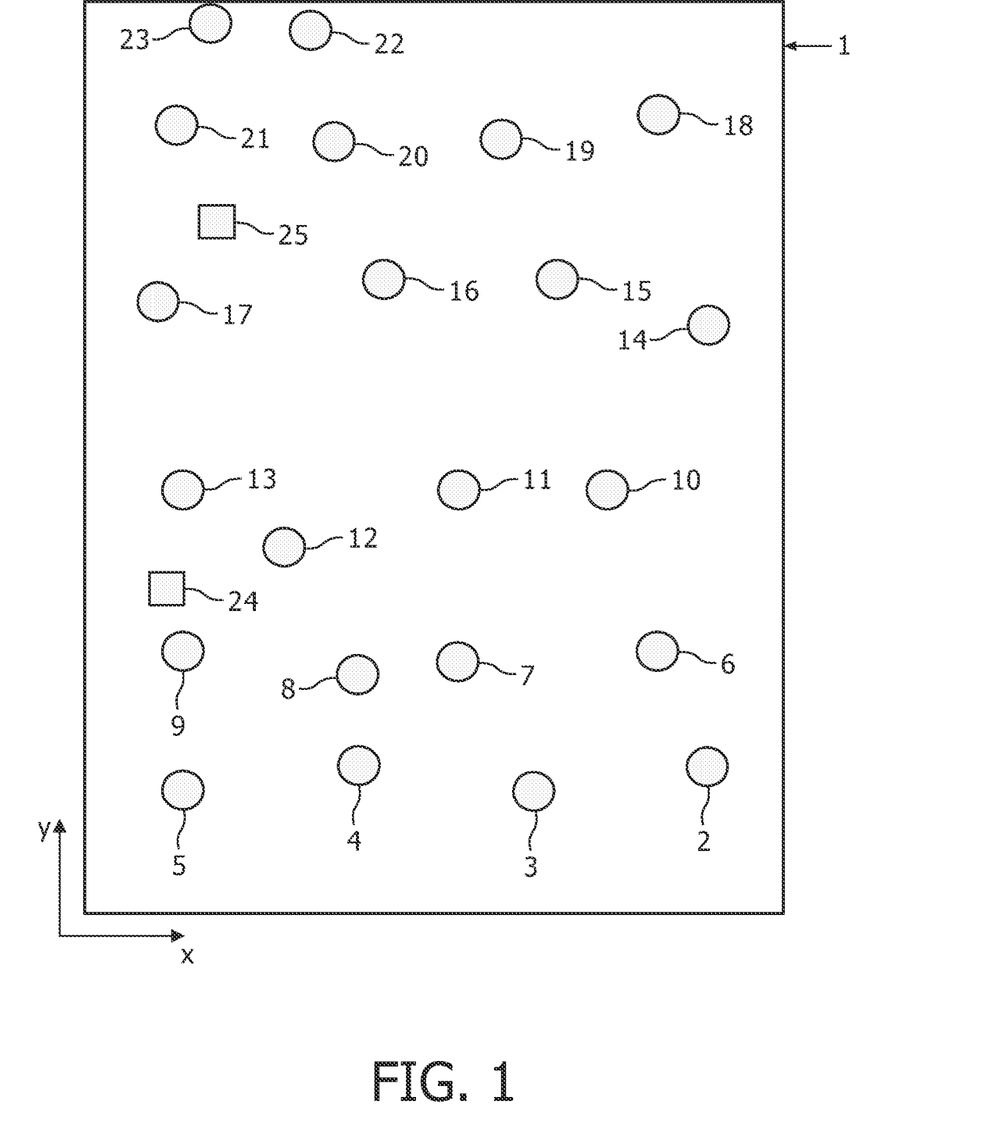
FIG. 1 is an illustration showing the structure of a wireless lighting array comprising luminaires and switch boxes.

Referring to FIG. 1, a wireless lighting array 1 comprises luminaires 2-23 and switch boxes 24, 25. The switch boxes 24, 25 are configured such that they are able to control the operation of the luminaires 2-23 through a wireless communication network 26, shown in FIG. 2.

Figure 2:
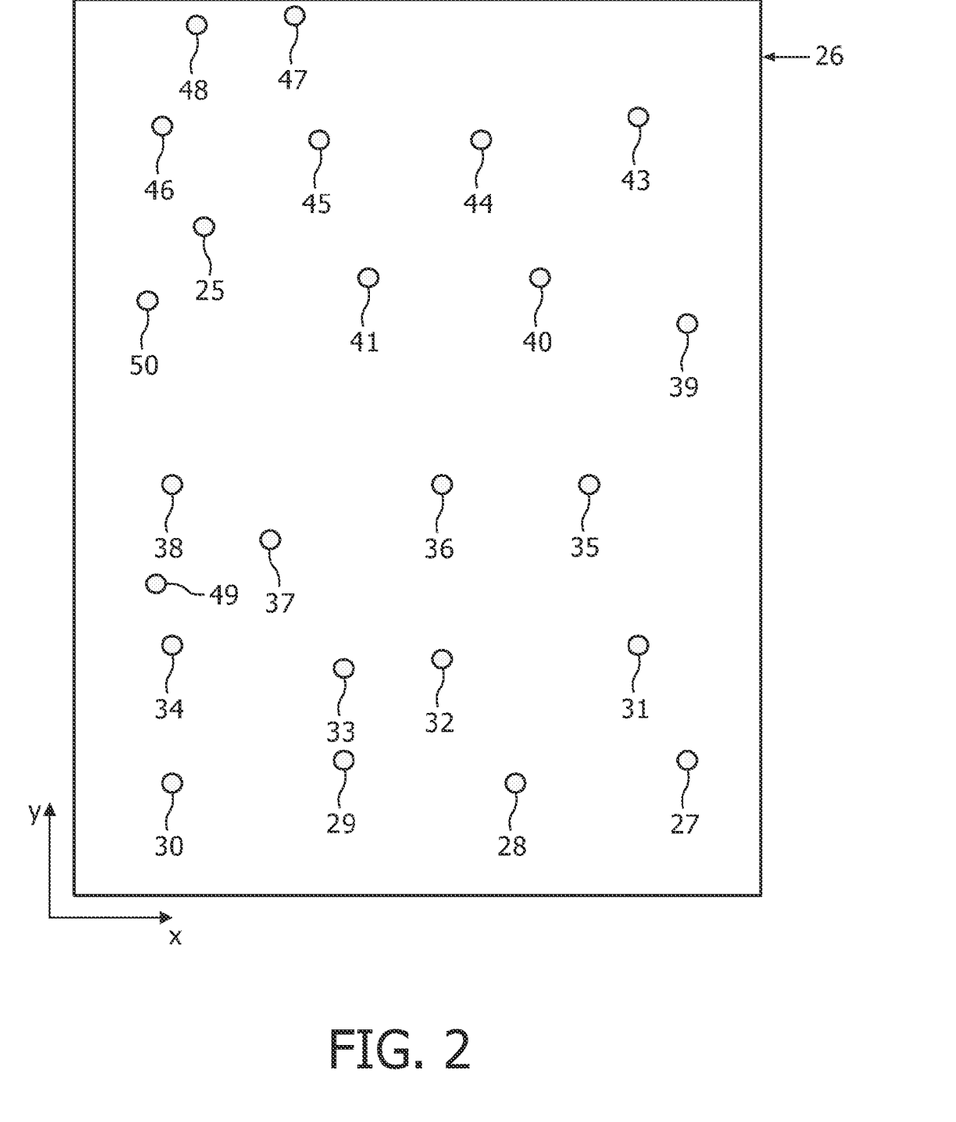
FIG. 2 is an illustration showing the derived topology of a wireless communication network comprising communication nodes and corresponding to the wireless lighting array of FIG. 1.

The wireless communication network 26 is formed by an arrangement of communication nodes 27-50 comprising, for example, ZigBee-like radio modules. The communication nodes 27-48 are each associated with a particular luminaire 2-23. Two further communication nodes 49, 50 are associated with the switch boxes 24, 25 respectively.

Figure 3:
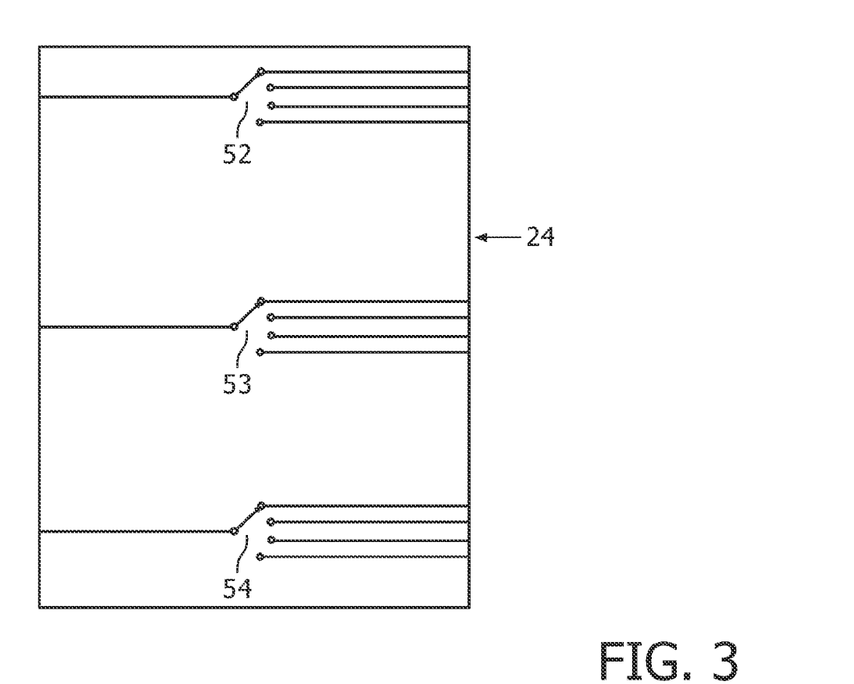
FIG. 3 is a diagram showing the individual switches inside a first switch box.
Figure 4:
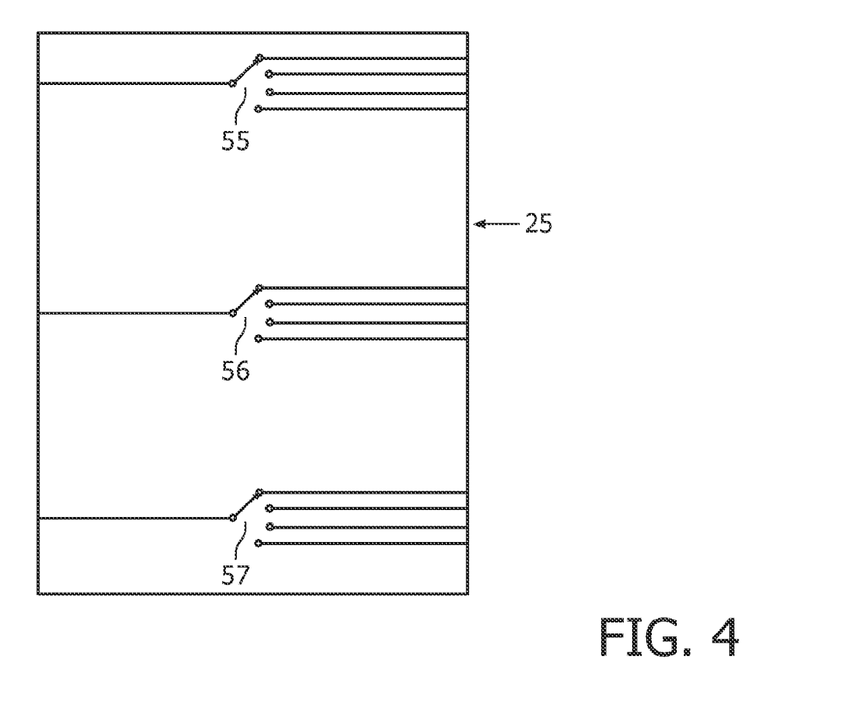
FIG. 4 is a diagram showing the individual switches inside a second switch box.

Referring to FIG. 3, the first switch box 24 comprises three switches 52-54 adapted to control three separate groups of luminaires within the lighting array 1. In this embodiment, each switch 52-54 is a selector switch configured such that it is able to apply a series of predetermined settings to a particular control group of luminaires. These setting may correspond, for example, to different brightness levels. Referring to FIG. 4, the second switch box 25 similarly comprises three switches 55-57 adapted for the same means.

Figure 13:
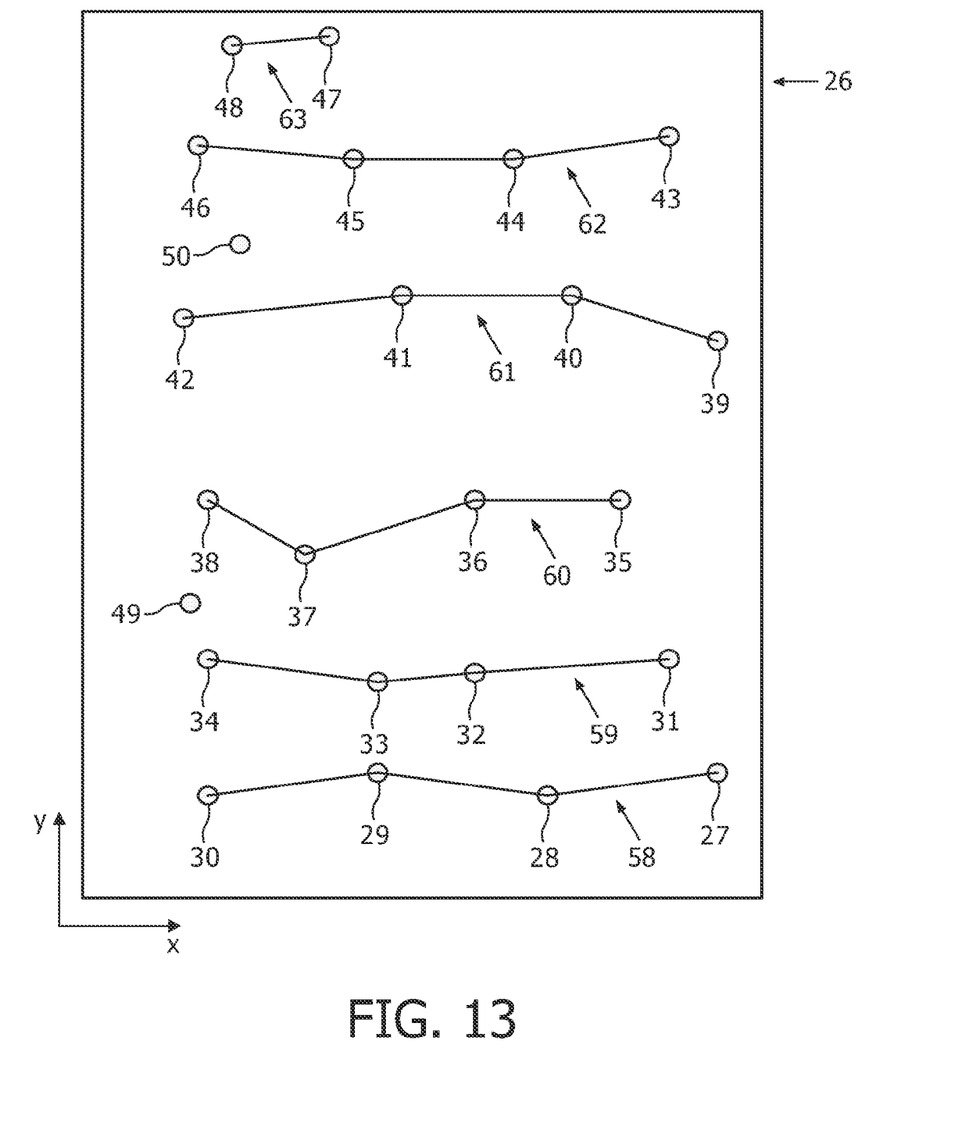
FIG. 13 is an illustration showing the assignment of communication nodes to control lines for an entire lighting array.

Accordingly, the switch boxes 24, 25 are capable of controlling six groups of luminaires 58-63 in all. The luminaires 2-23 are each controlled by one of the communication nodes 27-48, therefore, each node 27-48 must be assigned to one of the six control groups 58-63 before the lighting array 1 can be commissioned. The final assignment of nodes 27-48 to control groups 58-63 is shown in FIG. 13.

The first stage in commissioning the lighting array 1 is to establish the communication network 26. This is achieved by a network discovery process, which is initiated by all communication nodes 27-50 upon power-up. Every communication node 27-50 in the network 26 tunes to a control channel and broadcasts an "advertise" message, which contains its node type and a request that all other nodes identify themselves. After a random time, each other node replies to the message with its identity and functionality. However, the nodes 27-50 are unable to supply their position information. At this stage, therefore, the topology of the network 26 is unknown.

The topology of the network 26 may be established using a topology generation algorithm 51. Since the structure of the node network 26 is equivalent to the structure of the array of luminaires 2-23 and switch boxes 24, 25, the topology of the network 26 is used to gain an understanding of the structure of the lighting array 1.

Although the following description is relevant to the derivation of the network topology using a topology generation algorithm 51, in another embodiment of the invention, the topology of the network 26 may be established manually or may be pre-defined by some other means, for example by a template corresponding to the locations of the communication nodes 27-50.

The topology generation algorithm 51 calculates the relative position of each node, and hence luminaire, using range data provided by the wireless communication network 26. The range data is provided in the form of range measurements taken between pairs of communication nodes 27-50 in the wireless network 26. The calculation of a range between a node and its neighbour is derived directly from these range measurements, which are made using techniques like Received Signal Strength Indication (RSSI) or Time-of-Flight.

In the case of RSSI, the received strength of a radio signal exchanged between a pair of communication nodes is used to calculate the range between them. The strength of the transmitted signal decreases at a rate inversely proportional to the distance traveled and proportional to the wavelength of the signal. Hence, taking the wavelength into account, the distance between the pair of nodes may be calculated from the transmitted signal's attenuation at the receiving node.

In the case of Time-of-Flight measurements, the range between a pair of communication nodes is calculated by measuring the time taken for a radio signal to travel between them. It is known that radio signals travel at the speed of light, hence, an accurate measure of the time-of-flight between the pair of nodes provides an accurate calculation of the distance between them.

Figure 5:
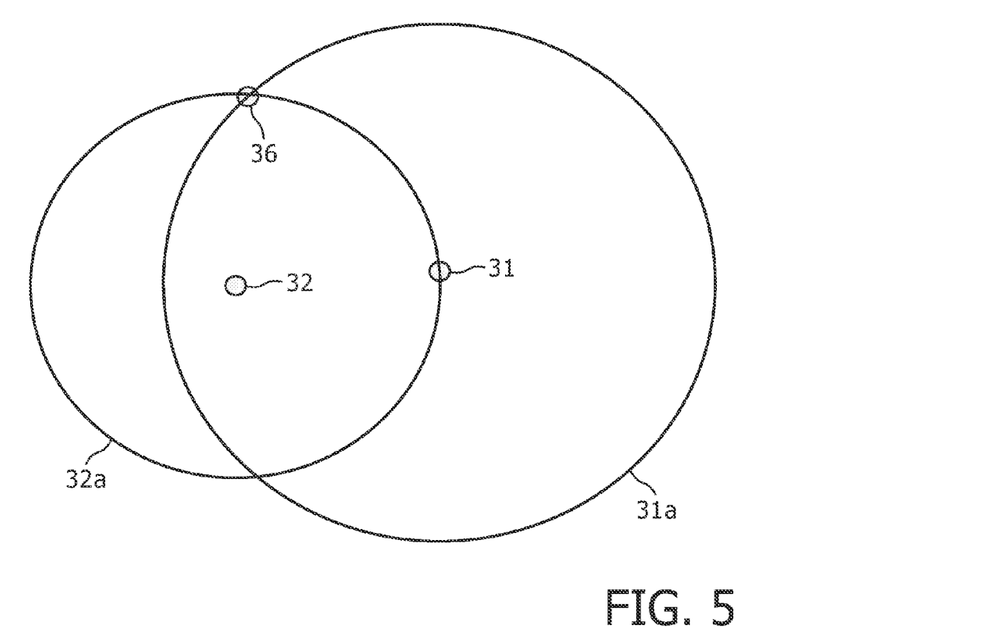
FIG. 5 is an illustration of the method by which a topology generation algorithm derives the structure of a communication network.
Figure 6:
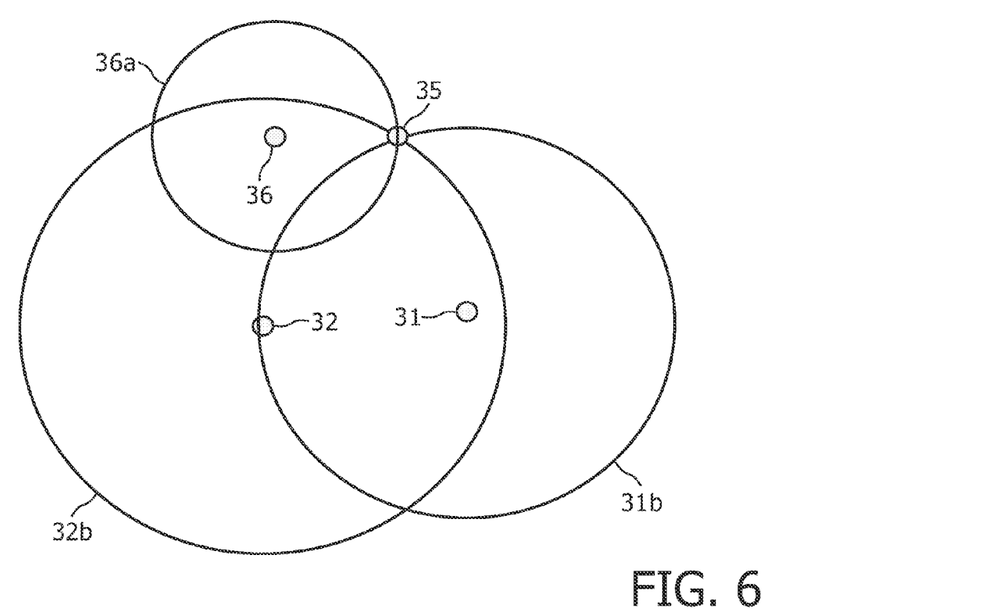
FIG. 6 is a further illustration of the method by which a topology generation algorithm derives the structure of a communication network.

FIGS. 5 and 6 show the method by which the topology generation algorithm 51 uses range measurements to derive the positions of the nodes 31, 32, 35, 36 of FIG. 2. Following the collection of range data, the topology generation algorithm 51 chooses a first node 32 in the network 26 and assigns it a nominal reference position. It then places a second node 31 at a point on a surrounding circle 32a, the radius of which is defined by the range measurement between the two nodes 32, 31. Further range measurements, made between the first node 32 and third node 36 and between the second node 31 and third node 36, enable the third node 36 to be placed at an intersection between the first circle 32a and a second circle 31a.

The radius of the second circle 31a defines the distance between the second node 31 and the third node 36. It does not matter for auto-commissioning purposes if the derived topology of the network 26 is reflected or rotated, therefore both of the intersection points between the circles 32a, 31a are valid positions for the third node 36.

Once established, the positions of the three nodes 31, 32, 36 are used, by the topology generation algorithm 51, as a fixed frame of reference for the placement of the fourth node 35 in the network 26.

Referring to FIG. 6, the fourth node 35 may be positioned by making three final range measurements. These are made between the first node 32 and fourth node 35; between the second node 31 and fourth node 35; and between the third node 36 and fourth node 35. The measurements are defined by the radii of circles 32b, 31b and 36a respectively and the fourth node 35 is placed at their intersection.

The topology generation algorithm 51 is able to calculate the positions of the remaining nodes in the network 26 by the same method, using the positions of the first four nodes 31, 32, 35, 36 as reference points.

However, the RSSI or Time-of Flight measurements, which are used in order to calculate the ranges between nodes 27-50, can be affected by factors such as temperature and battery level. In addition, there may be errors introduced due to component differences, variations in antenna performance and multipath effects. Such errors are carried through when calculating the ranges between pairs of communication nodes 27-50 and, hence, lead to a level of uncertainty in the derived node positions. This effect is reflected by FIG. 2, where it can be seen that the network structure derived by the topology generation algorithm 51 is irregular. Generally, however, the structures of lighting arrays are known to be regular in order that they are able to provide a minimum working level of background light. The structure of a lighting array may be dictated, for example, by the structure of a false ceiling.

Figure 11:
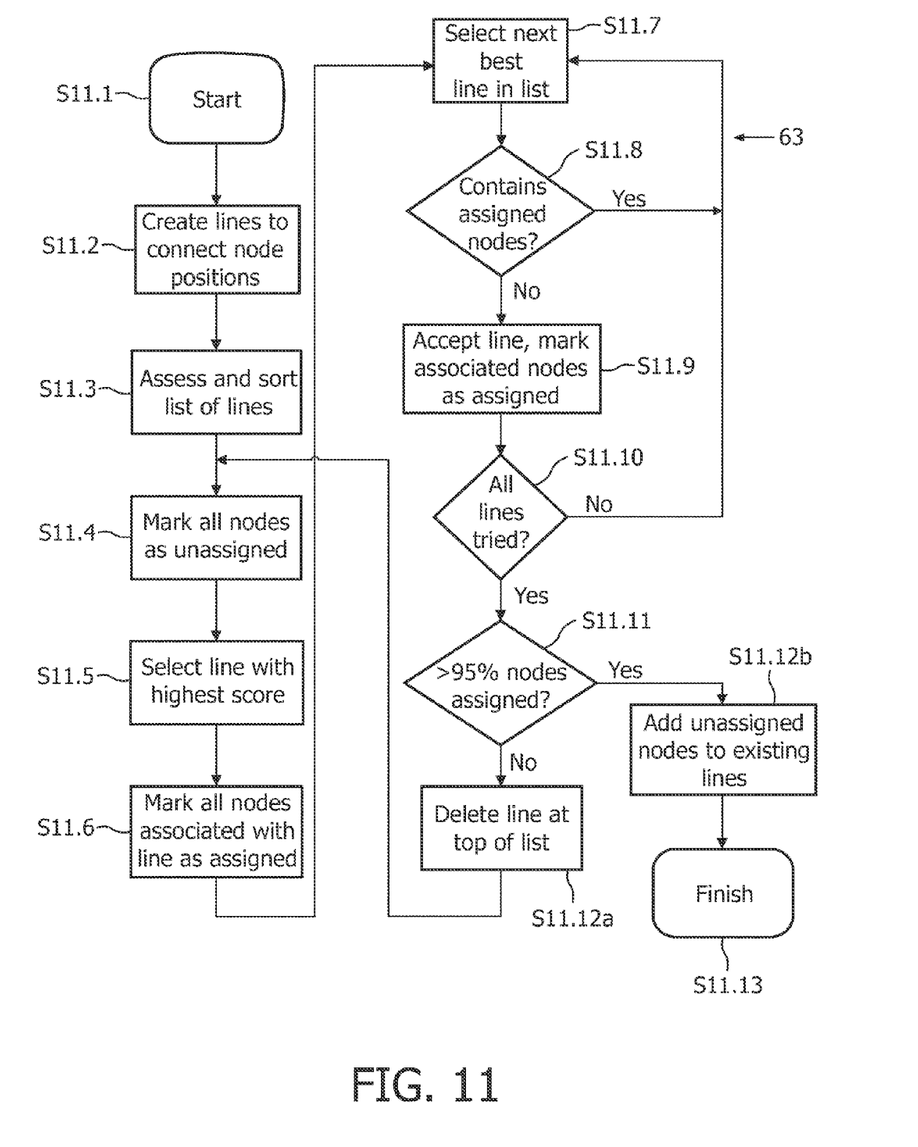
FIG. 11 is a flow diagram showing the steps associated with the operation of an assignment algorithm according to the present invention.
Figure 12:
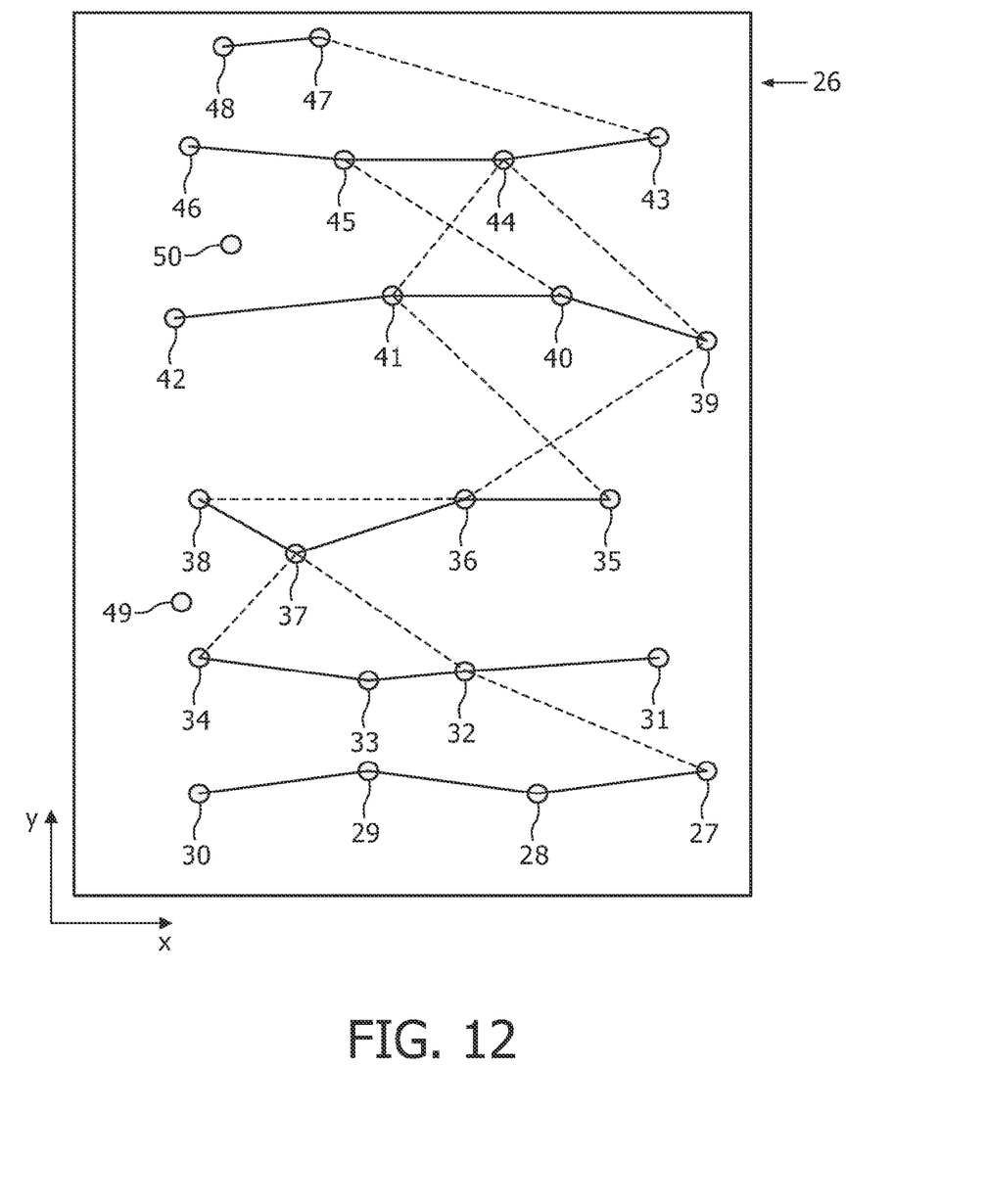
FIG. 12 is an illustration showing the construction of lines between communication nodes for an entire lighting array.

In order to overcome this uncertainty and assign the luminaires to the correct control group 58-63, there is provided an assignment algorithm 64, shown in FIG. 11, which is adapted to interpret the derived structure of the lighting array 1. The assignment algorithm 64 is configured such that, despite the previously described defects in the derived node positions, it is able to assign the nodes 27-48 to the correct control groups 58-63, as shown in FIG. 12.

In doing this, the assignment algorithm 64 is adapted to construct a series of straight lines between communication nodes 27-48. In this example of the invention, the series of lines are constructed in the x-y space of FIG. 2, however, in another embodiment of the invention, the lines may be constructed in x-y-z space. Each constructed line passes through as many nodes as possible, connecting the nodes together to form a spatial group.

Figure 7:
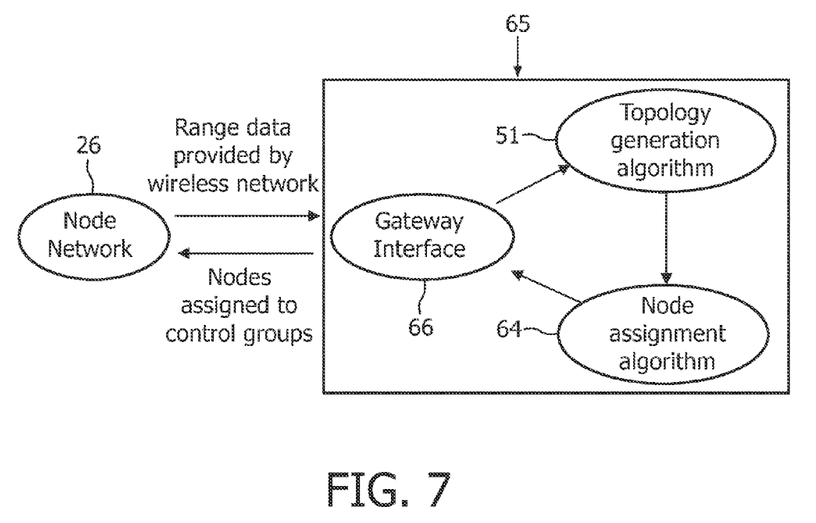
FIG. 7 is a diagram showing the implementation of a topology generation algorithm and an assignment algorithm according to the present invention.

Referring to FIG. 7, the assignment algorithm 64 is adapted such that it may be implemented, for example, by a laptop computer 65 which communicates with the wireless network 26 through a gateway interface 66. The assignment algorithm 64 may similarly be implemented by a handheld computer device, such as a PDA.

The gateway interface 66 comprises a stand-alone program, running on the computer 65, which requests and collects data from the communication network 26 through a gateway provided by one of the switch box nodes 49, 50. The collected data includes the functionality of each node 27-50 and the range measurements between each pair of nodes 27-50. The gateway interface 66 continuously monitors the network 26 and is able to detect if new nodes are added to, or disappear from, the network 26.

Figure 8:
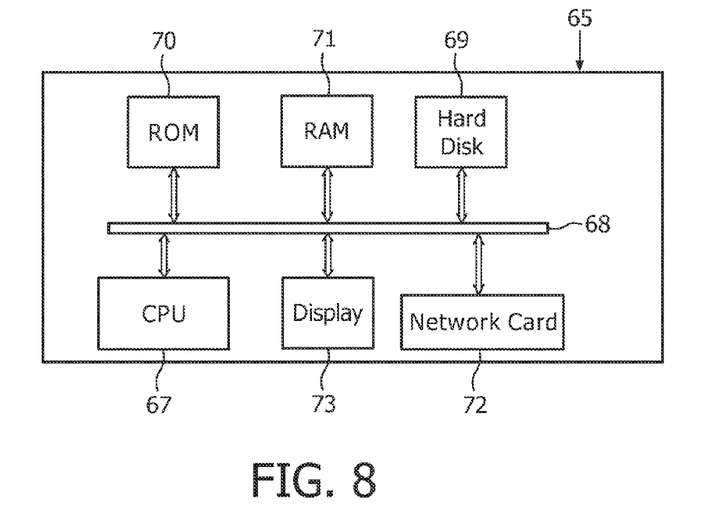
FIG. 8 is a block diagram showing a computer architecture configured to implement an assignment algorithm according to the present invention.

Referring to FIG. 8, the hardware of the computer 65 includes a central processing unit (CPU) 67 for executing the assignment algorithm 64 and for managing and controlling the operation of the computer 65. The CPU 67 is connected to a number of devices via a bus 68, the devices including a storage device, for example a hard disk drive 69, and memory devices including ROM 70 and RAM 71. The computer hardware further includes a network card 72, which provides means for interfacing to the communication network 26, and a display 73, which allows a user to monitor the operation of the computer 65.

The laptop computer 65 is adapted to communicate with the gateway via a serial or Ethernet cable. However, in another embodiment of the invention, the computer 65 may communicate with the gateway wirelessly.

In another embodiment of the invention, the assignment algorithm 64 is adapted such that it may be implemented by computer hardware which is integrated into the wireless communication network 26. Such hardware could be comprised, for example, as part of the switch box nodes 49, 50.

Again referring to FIG. 7, in commissioning the lighting array 1, the computer 65 requests and receives range data from the wireless communication network 26 through the gateway provided by one of the switch box nodes 49, 50. Using the received range data, the computer 65 implements the topology generation algorithm 51 to establish the topology of the network 26, as previously described.

Following the establishment of the network topology, the computer 65 implements the assignment algorithm 64 and assigns the nodes 27-48 to control groups 58-63. The communication nodes 27-50 are provided with storage means such that they are able to store the assignment configuration. The communication nodes 27-50 are then able to implement the stored configuration each time the lighting array 1 is switched on.

The assignment algorithm 64 comprises a line construction process, a threshold process and a line sorting and selection process. The threshold process allows the assignment algorithm 64 to overcome the defects caused by errors in the RSSI or Time-of-Flight measurements, as previously described.

Following the completion of the line sorting and selection process, the assignment algorithm 64 outputs a set of compatible control lines 58-63 which are used to assign the nodes 27-48 into control groups 58-63.

Figure 9:
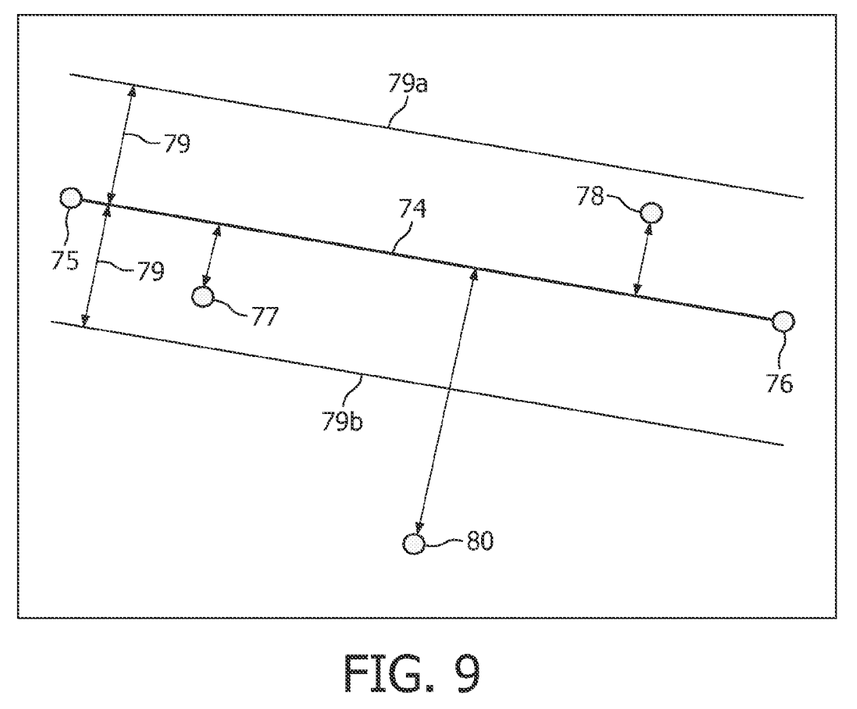
FIG. 9 is an illustration showing the creation and the assessment of a constructed control line connecting individual communication nodes together.

Referring to FIG. 9, a constructed line 74 connects a node 75 to another node 76. Two further nodes 77, 78 fall within a threshold distance 79 of the line 74 and, hence, the assignment algorithm 64 attaches these two nodes 77, 78 to the line 74 as well. In this example, the threshold distance 79 is defined perpendicular to the line 74, and is present on both sides. There is, therefore, defined a threshold boundary 79a, 79b on either side of the line 74. A third node 80 is positioned too far from the line 74 to fall within the threshold distance 79 and is, therefore, not included. This process is further represented in FIG. 11, step S11.2.

The assignment algorithm 64 overcomes the defects arising from the ranging process by attaching all nodes 75-78 to the line 74, as long as they are within the threshold distance 79. In this way, the assignment algorithm 64 is configured such that it is able to absorb errors in the individually derived positions of the communication nodes 27-50. The result is that the accuracy of node assignment is vastly improved, meaning that it is far more likely that individual nodes are allocated to the correct control group 58-63. It can be seen from FIG. 9 that the node 80 falls outside of the threshold boundaries 79a, 79b, defined by the threshold distance 79, and so it is not included within the control group associated with the line 74.

Figure 10:
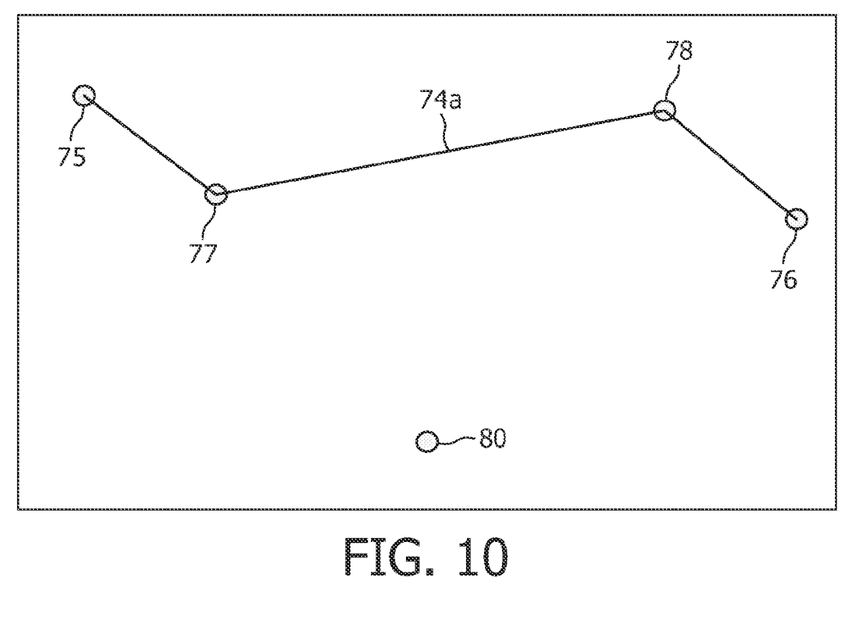
FIG. 10 is an illustration showing the assignment of individual communication nodes to a control line.

Referring to FIG. 10, following the construction of the line 74 and attachment of further nodes 77, 78, the line forms a zigzag like shape 74a. The third node 80 is left unattached by the assignment process and therefore does not form part of the spatial group associated with the line 74a.

Referring to FIG. 12, a series of lines are constructed on the node network 26. At this stage, many of the nodes 27-48 are attached to multiple lines, making them potential members of multiple control groups. Referring to FIG. 11, S11.4, the assignment algorithm 64 initially marks all nodes as being "unassigned".

Again referring to FIG. 11, step S11.3, once the assignment algorithm 64 has finished constructing lines, it assesses the quality of each line and assigns each line a score. The score is based upon the line's length, the number of nodes which the line includes, the standard deviation of the nodes from the straight path of the line and the standard deviation of the distance between nodes on the line.

The assignment algorithm 64 scores a line as being high quality if it has a long length, includes a large number of nodes and has a small value for the two standard deviations.

Once all of the constructed lines have been assigned scores, the assignment algorithm 64 sorts the lines, by their score, into a list. The highest scoring line is placed at the top of the list and the lowest scoring line is placed at the bottom. At this stage, it is likely that some nodes in the network 26 will be attached to more than one of the constructed lines.

Referring to step S11.5, following the sorting of the lines into quality order, the assignment algorithm 64 begins the selection of control groups. The algorithm selects the highest scoring line from the list as a first control line and marks all nodes associated with it as being "assigned" in step S11.6. The assignment algorithm 64 then selects the next highest scoring line from the list, in step S11.7, and checks, in step S11.8, as to whether the line contains any nodes that have already been assigned to the first line by step S11.6.

If the second line does not contain nodes which have already been assigned, the line is accepted as a second control line and the assignment algorithm 64 progresses to step S11.9 by marking all of its nodes as "assigned". Contrastingly, if the second line contains nodes which have already been assigned, the assignment algorithm 64 returns to step S11.7 and tries the next best line from the list. The assignment algorithm 64 further assesses each prospective control line's slope in comparison with the slope of lines which have already been accepted as control lines. Prospective lines which cross over lines already having been accepted are automatically disregarded.

The assignment algorithm 64 continues in this manner until a second line has been accepted as a control line. It then employs the same procedure to select a third control line. In this way, the assignment algorithm 64 selects control lines which are distinct, i.e. without shared nodes.

Referring to step S11.10, each time a line is accepted, the assignment algorithm 64 checks to see whether all of the lines have been tried. If the answer is no, the algorithm 64 returns to step S11.7 and tries the next line from the list. If the answer is yes, the algorithm 64 progresses to step S11.11. Here, the assignment algorithm 64 checks to see whether 95% of the nodes have been assigned to an accepted control line.

If less than 95% of the nodes have been assigned to an accepted line, the assignment algorithm 64 deletes the highest scoring line from the list, in step S11.12a, and returns to step S11.4. Here, all nodes are again marked as "unassigned" and the process of selecting control lines is restarted.

If, on the other hand, 95% or more of the nodes have been assigned to an accepted control line, the assignment of nodes is considered to be successful. The assignment algorithm 64 proceeds to attach any remaining unassigned nodes to their nearest accepted control line, in step S11.12b, making the selection of control lines complete.

Each of the accepted control lines defines a spatial control group 58-63 of communication nodes. The determined topology of the network 26 is then consulted to ascertain the appropriate switch box 24, 25 for each of the control groups 58-63 and the appropriate binding commands are sent out to connect the control groups 58-63 to the appropriate switch box 24, 25.

Referring to FIG. 13, the network of communication nodes 26 is divided into control groups 58-63. The first control group 58 contains a first set of communication nodes 27-30 and is controlled by the first switch 52 in the first switch box 24. The second control group 59 contains a second set of communication nodes 31-34 and is controlled by the second switch 53 of the first switch box 24. The third control group 60 contains a third set of communication nodes 35-38 and is controlled by the third switch 54 of the first switch box 24.

The fourth control group 61 contains a fourth set of communication nodes 39-42 and is controlled by the first switch 55 of the second switch box 25. The fifth control group 62 contains a fifth set of communication nodes 43-46 and is controlled by the second switch 56 of the second switch box 25. Finally, the sixth control group 63 contains a sixth set of communication nodes 47, 48 and is controlled by the third switch 57 of the second switch box 25.

The groups of luminaires 58-63 can be independently controlled, since each is allocated to a separate switch 52-57 inside one of the switch boxes 24, 25.

In use, the switch boxes 24, 25 may communicate with nearby light sensors in order to provide control inputs to the switches 52-57. Groups of luminaires may then be automatically switched-on in response to ambient light levels falling below a pre-programmed threshold.

The switches 52-57 may provide a simple on/off function for the luminaires, but the switches 52-57 may be adapted such that they are able to provide a multitude of settings which correspond to varied intensities of light being emitted by the luminaires. In order to provide the lighting system with maximum flexibility, each control group may be associated with its own light sensor, located close-by, so that it is controlled independently of the other groups.

The switch boxes 24, 25 may additionally communicate with motion sensors, infrared sensors or the like. Furthermore, the switch boxes 24, 25 may be configured to communicate with a user-actuated control means, such as a switch, dial, touch-screen panel or building management system. In this way, a user could control the various groups of luminaires 58-63 independently in order to customise the lighting settings for a particular circumstance.

It will be appreciated that the scope of the invention is not just restricted to wireless lighting arrays, but is also applicable to any type of wireless communication apparatus comprising a series of individual communication nodes. Furthermore, the techniques disclosed here are generally applicable to any positioning application in which a regular structure is to be identified based upon individual position measurements that are subject to error.

Although claims have been formulated in this application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of grouping a derived spatial arrangement of wireless nodes comprising:
dividing said arrangement into a plurality of spatial groups by defining a center of a particular group based on the spatial arrangement of the wireless nodes and assigning a particular wireless node to the particular group if a distance between the particular wireless node's spatial position in said arrangement and the defined center of said particular group is equal to or less than a defined threshold distance.

2. The method according to claim 1 wherein the center of each spatial group is defined by a line which passes through two or more nodes and said distance between a particular node and a particular group's center is measured as the shortest distance between the node's position in said arrangement and the closest point on the particular group's center-defining line.

3. The method according to claim 2 including ranking the spatial groups according to the number of assigned nodes therein.

4. The method according to claim 2 including ranking the spatial groups according to the statistical dispersion in the distances between the positions of assigned nodes and their center-defining lines.

5. The method according to claim 2 including ranking the spatial groups according to the statistical dispersion in the distances between adjacent assigned nodes.

6. The method according to claim 4 wherein said statistical dispersion is the standard deviation or variance.

7. The method according to claim 2 including ranking the spatial groups according to the length of their center-defining lines.

8. The method according to claim 1 including sorting said spatial groups into rank order based upon their attributes.

9. The method according to claim 8 including selecting a number of said spatial groups to define independent control groups.

10. The method according to claim 9 including not allowing said nodes to be members of more than one of said control groups.

11. The method according to claim 9 including selecting said spatial groups as said control groups in said rank order.

12. The method according to claim 9 including disregarding the top ranked spatial group and restarting the selection of said control groups if the selection of said control groups is unsuccessful.

13. The method according to claim 9 including binding said control groups to appropriate control means if the selection of said control groups is successful.

14. The method according to claim 1 wherein said threshold distance is pre-determined by user selectable means.

15. An apparatus configured to group a derived arrangement of wireless nodes comprising:
 a network card operable to interface to wireless nodes, and
 a processor operable to divide said arrangement into a plurality of spatial groups by defining a center of a particular group based on the spatial arrangement of the wireless nodes and assigning a particular wireless node to the particular group if a distance between the particular wireless node's spatial position in said arrangement and the defined center of said particular group is equal to or less than a defined threshold distance.

16. The apparatus according to claim 15 wherein said wireless nodes are electrically powered communication nodes in a wireless communication network.

17. The apparatus according to claim 16 wherein said wireless communication network is configured to control the operation of a wireless lighting array.

18. The apparatus according to claim 17 wherein each of said wireless nodes is associated with a luminaire or a switch box comprising part of the wireless lighting array.

19. The apparatus according to claim 18 wherein said switch box is configured to control the operation of the luminaire.

20. A non-transitory computer-readable medium storing a computer program, which, when executed by a computer, causes the computer to perform
 grouping a derived spatial arrangement of wireless nodes by dividing the arrangement into a plurality of spatial groups by defining a center of a particular group based on the spatial arrangement of the wireless nodes and assigning a particular wireless node to the particular group if a distance between the particular wireless node's spatial position in said arrangement and the defined center of the group is equal to or less than a defined threshold distance.

* * * * *